United States Patent
Peck

[15] 3,668,514
[45] June 6, 1972

[54] DUAL VOLTAGE POWER SYSTEM FOR USE WITH VEHICLE ALTERNATORS AND THE LIKE

[72] Inventor: Donald W. Peck, Newbury Park, Calif.
[73] Assignee: Oaks Power Corporation
[22] Filed: Sept. 15, 1970
[21] Appl. No.: 72,311

[52] U.S. Cl. ................................322/28, 290/40, 307/10 R, 307/28, 307/47, 307/75, 321/28
[51] Int. Cl. .......................................................H02p 11/00
[58] Field of Search ....................290/40; 307/9, 10, 22, 26, 307/28, 29, 47, 59, 75; 321/28; 322/14, 15, 28

[56] References Cited

UNITED STATES PATENTS

| | | | |
|---|---|---|---|
| 3,192,394 | 6/1965 | Teter | 290/40 R |
| 3,287,623 | 11/1966 | Valancius | 307/22 X |
| 3,315,141 | 4/1967 | Wright et al. | 322/28 X |
| 3,316,416 | 4/1967 | Carlson | 307/10 X |
| 3,530,359 | 9/1970 | Grist | 307/75 X |
| 3,488,560 | 1/1970 | Konopa | 320/DIG. 2 |
| 3,427,528 | 2/1969 | Custer | 322/28 X |

Primary Examiner—William M. Shoop, Jr.
Attorney—Lyon & Lyon

[57] ABSTRACT

There is disclosed herein a dual voltage power unit for use in automobiles, campers, and the like for normally supplying the relatively low DC voltage from an alternator to a storage battery and other electrical devices of the vehicle and for supplying a higher voltage, such as 115 volts, for external usage such as for lighting, emergency power, and so forth. Several circuits are disclosed herein for providing a dual output DC voltage, or for providing a low DC voltage and a higher AC voltage at 60 hertz. The system includes a rectifier circuit coupled with the output of an alternator for normally providing the usual automotive DC voltage, such as 14.5 volts. A load sensor and control circuit are provided for sensing the demand for the higher voltage and for controlling rectifier circuits to supply the same.

12 Claims, 3 Drawing Figures

INVENTOR.
DONALD W. PECK
BY
Lyon & Lyon
ATTORNEYS

INVENTOR.
DONALD W. PECK
BY Lyon & Lyon
ATTORNEYS

3,668,514

DUAL VOLTAGE POWER SYSTEM FOR USE WITH VEHICLE ALTERNATORS AND THE LIKE

This invention relates to power units and more particularly to dual voltage power units or power supplies for supplying different output voltages upon demand.

Heretofore systems have been proposed for providing from the alternator of a vehicle a dual voltage output. However, such systems have been characterized by relatively complex circuitry and the like, lack of reliability, and so forth. In particular, such devices have been constructed wherein the output of the usual alternator-rectifier is disconnected from the battery circuit through the use of a relay or silicon controlled rectifier (SCR) circuit. As is known, a positive voltage on the gate of an SCR causes the same to conduct regardless of whether or not this positive voltage is subsequently removed. In order to turn off the SCR, the source voltage must be reduced or the current across the SCR must be reduced for a predetermined period of time, such as several microseconds. Usually, a capacitor and switch are employed across the source to drop the supply current to the SCR for a sufficient period of time so as to turn off the SCR. Frequently the switch used is a relay or another SCR. However, such control circuits for SCRs are characterized by noise problems, which tend to turn the SCR back on after it has been turned off, and the usual switch contact problems associated with switch-capacitor control arrangements. The present concepts obviate these disadvantages of prior art control circuits while still providing a relatively simple dual voltage supply which is reliable in operation.

Accordingly, it is a principal object of the present invention to provide a novel dual voltage power unit.

Another object of this invention is to provide an improved control circuit for silicon controlled rectifiers and the like.

A further object of this invention is to provide a dual voltage supply for use with an alternator in providing low and high DC output voltages.

Another object of this invention is to provide a novel dual voltage power supply for use with an alternator for providing a low DC output and a higher AC output.

These and other objects and features of the present invention will become better understood through a consideration of the following description taken in conjunction with the drawings in which:

FIG. 1b illustrates a modification for a portion of the circuit of FIG. 1a; and

FIG. 2 is a block diagram of a dual voltage power unit according to the present concepts for providing DC and AC output voltages.

Briefly, in accordance with an exemplary embodiment of the concepts of the present invention, a suitable dual voltage output is provided by employing three conventional silicon controlled rectifiers and three conventional rectifiers coupled with a three-phase alternator, such as those employed in automobiles and other vehicles. These rectifiers supply the normal battery charging and vehicle accessory equipment voltage. Additionally, a plurality of diodes are employed for supplying an external higher voltage, such as 110 to 115 volts DC. A load sensor is provided, and upon demand for the higher external voltage, the throttle of the vehicle is automatically set at a predetermined position to cause the alternator to run at a speed so as to provide a sufficient power output. The load sensor also causes the SCRs to turn off. Several of the other diodes then supply the higher voltage to an external power plug. Thus, the SCRs normally supply the usual approximately 14.5 volts DC, but are turned off upon demand for external power and then voltage is supplied through other diodes to the external plug. An alternative arrangement for accomplishing a similar objective is disclosed, and another alternative arrangement is disclosed for providing an AC output to the external power plug.

Figure 1A:
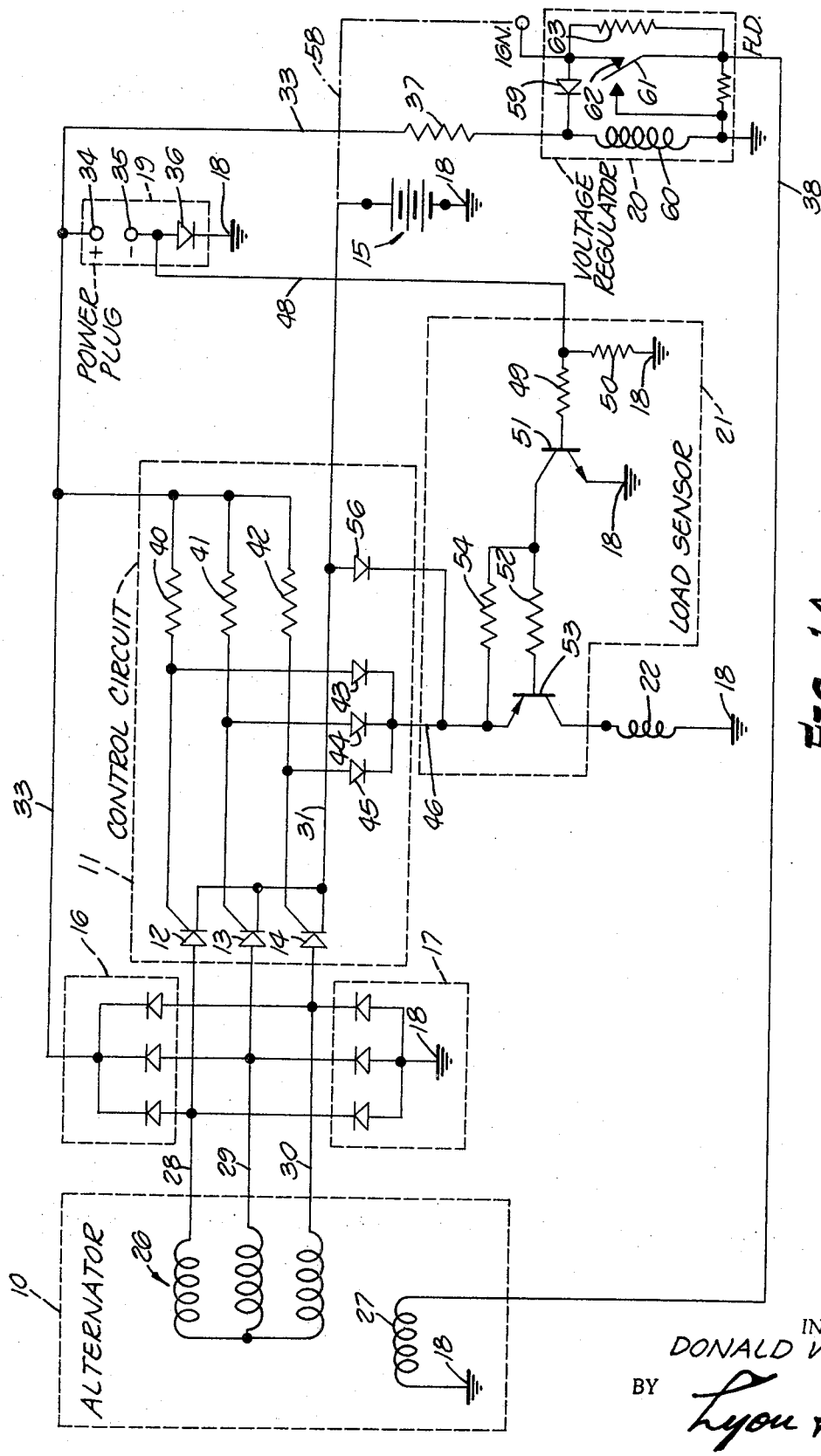
FIG. 1a is a circuit diagram of a system in accordance with the teachings of the present invention for providing a dual DC voltage output.

Turning now to the drawings, and first to FIG. 1a, an exemplary system is illustrated including an alternator 10 coupled through a control circuit 11, including three silicon controlled rectifiers 12 through 14, to a vehicle battery 15. Positive rectifiers 16 and negative rectifiers 17 are connected with the output of the alternator 10. The negative rectifiers 17 are connected to ground at 18, and the positive rectifiers are connected to a power plug 19 and to a voltage regulator 20. A load sensor 21 is coupled between the power plug 19 and the control circuit 11 for controlling the operation of the control circuit 11 in response to demand for power at the power plug. A throttle solenoid 22 also is coupled with the load sensor.

Before turning to a detailed description of the circuit in FIG. 1a, a general discussion of the operation will be set forth. The alternator 10 is rotated by the engine of the vehicle, and is excited by the vehicle battery 15 through the voltage regulator 20 in a conventional manner. The alternating current output of the alternator 10 is rectified by a bridge rectifier system including the negative rectifiers 17, positive rectifiers 16, and the SCRs 12 through 14 in the control circuit 11. The positive rectifiers 16 furnish the positive high voltage, such as 110 volts DC, to the power plug 19; whereas the SCRs 12 through 14 furnish current to the battery 15 when turned on. When an external load is plugged into the power plug 19, the load sensor 21 detects the current drawn and turns off the SCRs 12 through 14 thereby disconnecting the output of the alternator 10 from the vehicle battery 15. The load sensor 21 also applies current to the throttle solenoid 22 to increase the speed of the engine of the vehicle to a predetermined point. The voltage of the battery 15 drops allowing the voltage regulator 20 to feed full battery voltage to the field of the alternator 10 in a conventional manner. This increases the alternator voltage output, and when this voltage reaches the desired high voltage, such as 110 to 115 volts DC, the voltage regulator 20 reduces the alternator field voltage to regulate the output at the desired high voltage. When the external load is turned off or disconnected, the load sensor 21 removes current from the solenoid 22 allowing the engine to return to idle, and turns on the SCRs 12 through 14 thereby connecting the output of the alternator back to the battery 15. The voltage regulator 20 then regulates the alternator output for a bettery input voltage of approximately 14.5 volts DC in a conventional manner.

Turning more specifically to the circuit shown in FIG. 1a, the alternator 10 includes conventional stator windings 26 and a rotor winding 27. The stator windings are connected through lines 28 through 30 to the anodes of the SCRs 12 through 14, the cathodes of which are in turn connected together and to an output low voltage line 31. This line 31 is connected to the positive terminal of the battery 15, the negative terminal of which is grounded at 18. The negative rectifiers, which may be silicon diodes, are connected from the alternator output lines 28 through 30 to ground 18. Similarly, the positive rectifiers 16, which also may be silicon diodes, are connected from the output lines 28 through 30 to a line 33 which is connected to a positive terminal 34 of the power plug 19. The negative terminal 35 of the power plug is connected through a diode 36 to ground 18. The line 33 also is coupled through a voltage dropping resistor 37 to the control input of the voltage regulator 20, the field output of which is connected by a line 38 to the rotor 27 of the alternator 10. The line 33 from the positive rectifiers 16 also is coupled through resistors 40 through 41 to the respective gates of the SCRs 12 through 14. These gates also are coupled through respective diodes 43 through 45 to a line 46 which is connected to the output of the load sensor 21.

A line 48 is connected from the power plug terminal 35 to the input of the load sensor 21. The load sensor 21 includes input load resistors 49 and 50 coupled with the base of a transistor 51. The emitter of this transistor is grounded at 18, and the collector thereof is coupled through a coupling resistor 52 to the base of a transistor 53. The collector of this transistor is coupled through the throttle solenoid 22 to ground at 18, and a load resistor 54 is coupled between the emitter of this transistor and the collector of the transistor 51.

The emitter of the transistor 53 is connected to the output line 46. An emitter diode 56 is connected between the emitter of the transistor 53 and the line 31.

Turning more specifically to the operation of the circuit of FIG. 1a, during operation, the silicon controlled rectifiers 12 through 14 are turned on to furnish current through the line 31 to the battery 15 as noted earlier. The voltage regulator is set in a conventional manner to regulate the output of the alternator 10 for a system voltage of approximately 14.5 volts DC. This voltage also appears across the terminals 34 and 35 of the power plug 19.

When a load is applied to the power plug 19, the load sensor 21 detects the load and causes the SCRs 12 through 14 to turn off. This allows the battery voltage to drop to approximately 12.6 volts, and the voltage regulator 20 senses this voltage drop and increases the voltage on the alternator field. When the output voltage on the line 33 reaches the desired value of 110 to 115 volts, current through the voltage dropping resistor 37 is fed to the voltage regulator input to cause it to regulate the alternator output at 110 to 115 volts. The load sensor also causes the throttle solenoid 22 to advance the vehicle throttle to increase the speed of the engine to a predetermined point so that the alternator will furnish the desired power to the power plug.

Although shown separately, the load sensor 21 may be considered to include the high current diode 36 which is connected between the negative terminal 35 of the power plug 19 and ground 18. When the load is applied to the power plug 19 as noted earlier, the voltage drop across the diode 36 is applied across the load resistor 50 and through the resistor 49 to the base of the transistor 51. This causes the transistor 51 to conduct thereby dropping the collector voltage thereof to a low value and causes current to be drawn through the load resistor 54 and coupling resistor 52. The current through the coupling resistor 52 appears at the base of the transistor 53. The emitter of the transistor 53 acts as an emitter follower and through the diodes 43 through 45 causes a reduction in the gate voltage of the respective SCRs 12 through 14 to a negative value with respect to their cathodes thereby turning off the SCRs. Collector current of the transistor 53 passes through the emitter diode 56 and through the throttle solenoid in the collector circuit thereof. This causes the throttle solenoid to actuate, thereby advancing the engine throttle.

The diodes 16 rectify the output of the alternator 10 and apply this output through the line 33 to the power plug 19 as noted earlier. This output is also applied through the resistors 40 through 42 to the gates of the SCRs 12 through 14. This arrangement, during low voltage operation, turns on the SCRs 12 through 14, which furnish the low voltage DC output on the line 31. When the SCRs 12 through 14 are turned off by the load sensor 21, the diodes 16 rectify the output of the alternator and furnish the DC current to the plug 19. The diodes 17 at all times rectify the negative output, or negative half-wave of the alternator, and through ground 18.

The voltage of the battery 15 is fed to the ignition input of the voltage regulator 20 in a conventional manner as indicated by a dashed line 58. This voltage is fed through a diode 59 to the voltage sensing coil 60 of the voltage regulator, and through normally closed relay contacts 61–62 to the field output line 38. When the ignition voltage reaches approximately 14.5 to 15 volts, the relay contacts 61–62 open placing a resistor 63 in series with the field output. This reduces the alternator output voltage which reduces the battery and ignition voltage causing the contacts 61–62 to again close and apply full current to the alternator field. This increases the alternator voltage and this cycle repeats. The result is a regulated output voltage of approximately 14.5 volts. When the SCRs 12 through 14 are turned off, the lowered battery voltage allows the regulator contacts 61–62 to close thereby increasing the alternator output until the current through the voltage dropping resistor 37 causes the voltage regulator relay to operate. The value of the resistor 37 is chosen so that the operating point of the voltage regulator is reached when the high voltage output is approximately 110 to 115 volts.

Turning again to the control of the SCRs 12 through 14, the same are operated by changing the voltage on the output line 46 of the load sensor 21. Considering one SCR 12, for example, the same is in series with alternator output line 28 and line 31. The diode 43 is coupled between the gate of the SCR 12 and the line 46 which may be considered a control point. Because the source is AC, the SCR 12 automatically goes on and off because the source voltage varies from positive to negative. However, the load sensor 21 and diode 43 allow the SCR 12 to be intentionally turned off by supplying a negative voltage to the control point or line 46. The SCRs 13 and 14 operate in a like manner.

Figures 1B, 2:
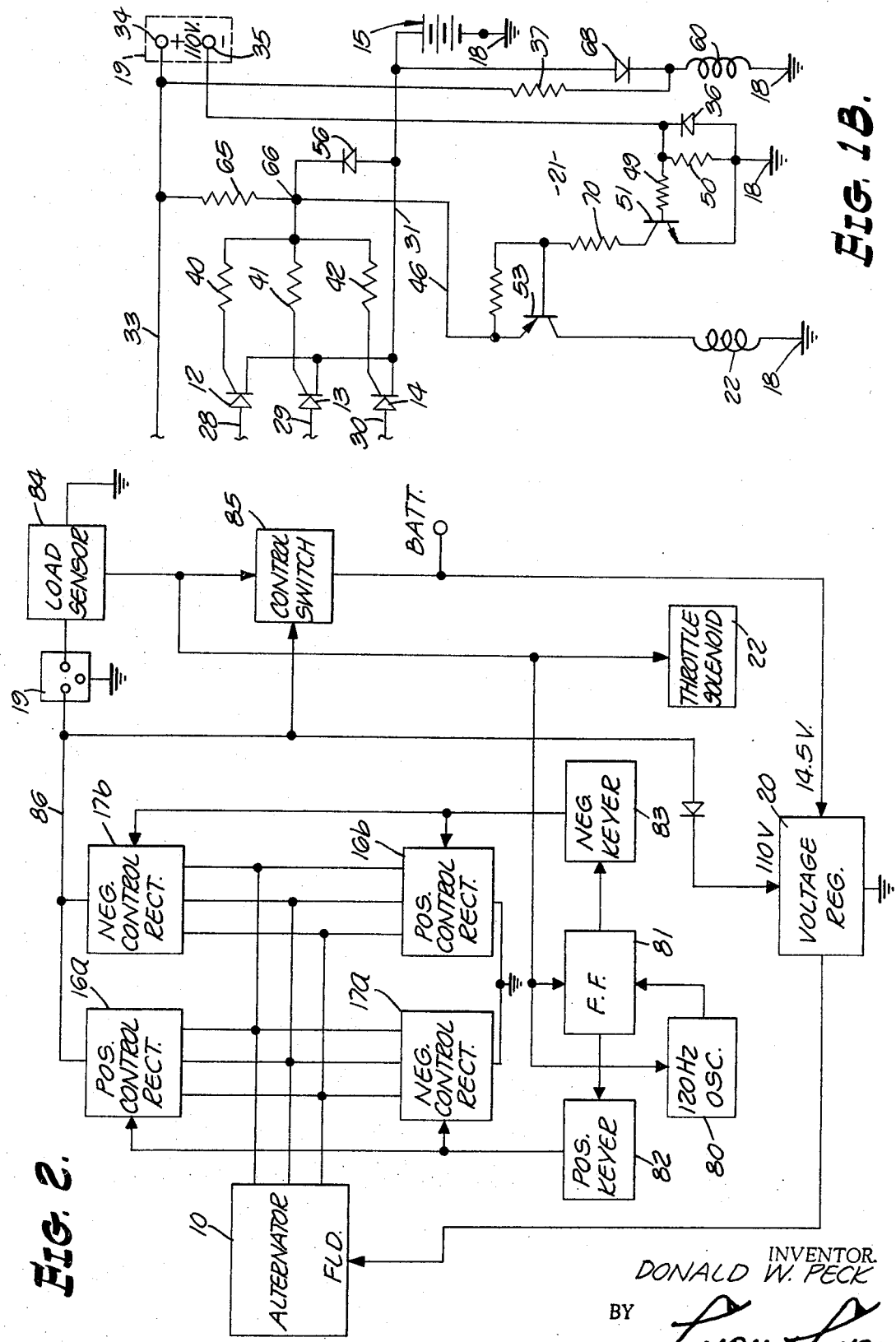

FIG. 1b illustrates a portion of a circuit constituting a modification of the circuit of FIG. 1a. Similar components are designated by like reference numerals. Thus, the SCRs 12 through 14 are connected from respective output lines 28 through 30 of the alternator 10 to a line 31 which in turn is connected to the battery 15. Similarly, the line 33 from the positive rectifiers 16 is connected to the positive terminal of the power plug 19. However, in this case a resistor 65 is coupled between the line 33 and the junction 66 of the resistors 40 through 42. The junction 66 is coupled to the line 46 from the load sensor 21 and through a diode 56 to the line 31. The positive voltage on the line 33 is applied through the resistor 65 and the resistors 40 through 42 to the gates of the SCRs 12 through 14 to cause the SCRs to turn on, thereby supplying the alternator output to the battery 15. When the battery is fully charged, the current through a diode 68 causes the voltage regulator to regulate the output voltage of the alternator in the manner described previously.

When a load is applied to the power plug 19, the voltage drop across input resistor 50 of the load sensor 21 is limited to approximately +0.75 volt by the diode 36. This voltage is fed through the resistor 49 to the base of transistor 51 which causes this transistor to conduct thereby lowering the voltage at the resistor 70 to near ground. The current through the resistor 70 causes the base of the transistor 53 to go negative which causes this transistor to conduct. Collector current of the transistor 53 flows through the throttle coil 22 and causes the engine to speed up as noted earlier. The emitter voltage of the transistor 53 is maintained at approximately +12 volts by the diode 56 which is coupled with the positive terminal of the battery 15. The emitter current of the transistor 53 and diode 56 removes the positive voltage from the gates of the SCRs 12 through 14 thereby turning off these rectifiers. This disconnects the output of the alternator from the battery 15 thereby lowering the voltage through the diode 68 causing the voltage regulator to increase the alternator output voltage. When the rectified output across the power plug 19 reaches 110 to 115 volts, the current through the resistor 37 causes the voltage regulator to regulate this output voltage.

When the load is removed from the power plug 19, the positive voltage at the base of the transistor 51 is removed which removes the negative voltage at the base of the transistor 53, thereby turning off the solenoid 22 allowing the engine to slow down to an idle. The reduction of emitter current of the transistor 53 allows the voltage at the terminal 66 to increase which in turn allows the SCRs 12 through 14 to again turn on and apply current to the line 31.

Turning now to the embodiment of FIG. 2, the same illustrates an arrangement utilizing the foregoing concepts, but for providing a low DC voltage output and a high AC voltage output, such as 110 volts Ac at 60 hertz. In this case, the alternator 10 is controlled by the voltage regulator 20 as described earlier. The alternating current output of the alternator 10 is three-phase and usually between 300 and 600 hertz. Two sets of bridge rectifiers are used in this instance, with rectifiers 16A and 17A providing a positive or one halfwave output, and rectifiers 16B and 17B providing a negative or other half-wave output. A 120 hertz oscillator 80 is coupled with a flip-flop 81 to cause the flip-flop to change state at a 60 hertz rate. The flip-flop 81 alternately turns on and off a positive keyer 82 and negative keyer 83. These keyers alternately turn on and off the respective rectifiers 16A–17A and 16B–17B, respectively, causing the output voltage thereof to go positive and negative at a 60 hertz rate.

When the load is removed from the output plug 19, the load sensor 84 stops the oscillator 80, and causes the flip-flop 81 to maintain the positive keyer 82 on and the negative keyer 83 off. The load sensor also causes a control switch 85 to turn on connecting the now positive alternator output on output line 86 to the vehicle battery, and removes current from the throttle solenoid 22 allowing the engine speed to return to an idle. The voltage regulator 20 now regulates the alternator field to maintain the battery voltage at 14.5 volts in a manner like that described earlier.

When a load is again applied to the power plug 19, the load sensor 84 turns off the control switch 85, turns on the oscillator 80 thereby allowing the flip-flop 81 to operate as described earlier. Likewise, the throttle solenoid 22 is turned on to increase the engine speed to a predetermined point, and the voltage regulator 20 regulates the output of the alternator at the higher voltage.

The present embodiments of this invention are to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. A power system for use with vehicle alternators and the like for providing a first voltage output and a second higher voltage output, comprising
    rectifier means adapted to be coupled with a vehicle alternator for supplying first and second rectified voltage outputs, said rectifier means comprising a first group of rectifier for rectifying the alternator output voltage and providing said first rectified voltage output for normal vehicle usage, and a second group of rectifiers for rectifying the alternator output voltage and providing said second rectified voltage output of higher voltage than said first rectified voltage output
    load sensor means coupled with said rectifier means and responsive to a demand for said higher voltage for causing said rectifier means to supply said higher voltage,
    plug means coupled between said rectifier means and said load sensor means for receiving said higher voltage, and
    voltage regulator means responsive to said first and second rectified outputs and adapted to be coupled to said alternator for regulating the output of said alternator.

2. A system as in claim 1 including,
    throttle solenoid means adapted to be coupled with the throttle of a vehicle for controlling the engine speed thereof, said throttle solenoid means being coupled with and responsive to said load sensor means.

3. A system as in claim 1 wherein,
    said first group of rectifiers comprises silicon controlled rectifiers having their anode-cathode circuit coupled to supply said first rectified voltage output and having gate electrodes, said load sensor being coupled to said gate electrodes of said silicon controlled rectifiers.

4. A system as in claim 3 including,
    rectifier means coupled between the load sensor means and said gates of said silicon controlled rectifiers, and
    said load sensor means comprises switching means responsive to the demand for said higher voltage for lowering the voltage applied to said gates.

5. A system as in claim 3 including,
    throttle solenoid means adapted to be coupled to control the engine speed of a vehicle, said throttle solenoid means being coupled to and responsive to said load sensor means.

6. A system as in claim 1 wherein
    said first group of rectifiers comprises a plurality of silicon controlled rectifiers having their anode-cathode circuits coupled to supply said first rectified voltage output and having gate electrodes,
    impedance means coupled with the second group of rectifiers for supplying said second rectified voltage output to the gates of said silicon controlled rectifiers for normally causing said silicon controlled rectifiers to supply said first rectified voltage output, and
    means coupling said gates to the output of said load sensor means for causing said silicon controlled rectifiers to turn off upon demand for said higher voltage.

7. A system as in claim 6 wherein
    said impedance means comprises a plurality of resistances having first terminals respectively coupled with said gates and second terminals connected to a common terminal, and means coupling said common terminal to the output of said first group of rectifiers, and
    said means coupling the output of said load sensor means to said gates comprises a plurality of rectifiers having first terminals respectively coupled with said gates and second terminals coupled with the output of said load sensor means.

8. A system as in claim 1 wherein
    said first group of rectifiers comprises a plurality of silicon controlled rectifiers having their anode-cathode circuits coupled to supply said first rectified voltage output and having gate electrodes,
    means coupled between said second group of recti-fiers and said gates comprising a plurality of resistances having first terminals respectively coupled to said gates and second terminals connected to a common terminal, and a resistance coupled between said common terminal and the output of said second group of rectifiers, and
    means coupling the output of said load sensor means with said common terminal.

9. A system as in claim 1 wherein said second rectified output is a modulated alternating current output, and including
    oscillator control means coupled to said rectifier means for causing said rectifier means to provide alternating current output upon demand therefor.

10. A power system for use with vehicle alternators and the like for providing a first voltage output for vehicle usage and a second higher voltage output, comprising
    rectifier means adapted to be coupled with a vehicle alternator for rectifying the alternator output and supplying first and second rectified voltage outputs, said rectifier means comprising a first group of rectifiers including silicon controlled rectifiers having their anode-cathode circuit coupled to supply said first rectified voltage output and having gate electrodes, and comprising a second group of rectifiers for supplying said second rectified voltage output of higher voltage than said first rectified voltage output,
    plug means coupled with the output of said second group of rectifiers for receiving said higher voltage,
    load sensor means coupled with said plug means and to said first group of rectifiers for causing said higher voltage to be supplied to said plug means upon demand at said plug means for said higher voltage, said load sensor means including switching means for causing a reduction of the voltage on said gates of said silicon controlled rectifiers, and
    impedance means coupling the output of said load sensor means with said gates of said silicon controlled rectifiers and including rectifier means coupling said output of said load sensor means with the output of said first group of rectifiers.

11. A power system for use with vehicle alternators and the like for providing a first voltage output and a second higher voltage output comprising
    rectifier means adapted to be coupled with a vehicle alternator for receiving the alternator output and supplying first and second voltage outputs, said first voltage output being a substantially low level DC output and said second voltage output being a substantially higher alternating voltage output, said rectifier means comprising a first group of rectifiers for providing said first voltage output for normal vehicle useage, and a second group of rectifiers for providing said second higher voltage output, plug means coupled with said rectifier means for receiving said higher voltage output upon demand therefor, and control means coupled between said plug means and said rectifier means for causing said higher voltage output to be supplied from said rectifier means upon demand at said plug means therefor, said control means including load sensor means coupled with said plug means for providing a control signal and oscillator means responsive to said load sensor means coupled with said rectifier means.

12. In a dual voltage power supply system for use with a vehicle alternator for providing a first out-put voltage and a second higher output voltage, the improvement comprising silicon controlled rectifier means having an anode-cathode circuit coupled to receive an alternating voltage and provide a first output voltage to a load, said rectifier means including a control gate, means coupling said gate to receive said alternating voltage, output circuit means to which said second higher voltage is supplied, switching means coupled with said output circuit means and responsive to demand for said second higher voltage for reducing the voltage on said gate to turn off said silicon controlled rectifier means, and means coupling said switching means to said gate.

* * * * *